United States Patent

[11] 3,554,156

[72] Inventors: Etuji Kishida and Takuo Ishida, both of c/o Shimano Industry Company, No. 77, 3-cho, Oimotu-cho, Sakai, Osaka, Japan
[21] Appl. No.: 766,439
[22] Filed: Oct. 10, 1968
[45] Patented: Jan. 12, 1971
[32] Priority: Aug. 16, 1968
[33] Japan
[31] No. 43/58674

[54] INDICATING SYSTEM OF OPERATIONAL STATE OF PARKING BRAKE FOR A BICYCLE
3 Claims, 6 Drawing Figs.
[52] U.S. Cl. .................................................. 116/114, 74/489, 116/124, 116/135, 192/4
[51] Int. Cl. .................................................. G01d 21/00
[50] Field of Search .................................................. 116/114, 115, 124, 115,5, 135, 58A; 74/475, 473, 487, 489; 200/50.3; 192/4, 6, 12, 36; 188/1, 1A

[56] References Cited
UNITED STATES PATENTS

| | | | |
|---|---|---|---|
| 2,293,698 | 8/1942 | Chaput | 116/124 |
| 2,905,017 | 9/1959 | Randolph | 74/489 |
| 3,301,086 | 1/1967 | Williams et al. | 74/475 |
| 3,352,173 | 11/1967 | Freeland | 196/6X |
| 3,406,587 | 10/1968 | Brilando et al. | 74/475 |
| 3,418,965 | 12/1968 | Rabinow | 116/115.5 |

Primary Examiner—Louis J. Capozi
Attorney—Moonray Kojima

ABSTRACT: A bicycle indicator system for showing the operational state of a brake and the gear shift condition of the bicycle, in which a brake position indicator plate is moveably connected to a brake handle lever and in parallel with and above a gear shift indicator plate such that movement of the brake handle lever to operate the brake will move said brake indicator plate to cover simultaneously all of the gear shift indicia on a gear shift indicator plate from view by an operator and such that release of the brake by movement of the brake handle lever will move said brake position indicator plate to uncover the gear shift indicator plate for view by the operator.

INVENTOR
ETUJI KISHIDA
AND TAKUO ISHIDA

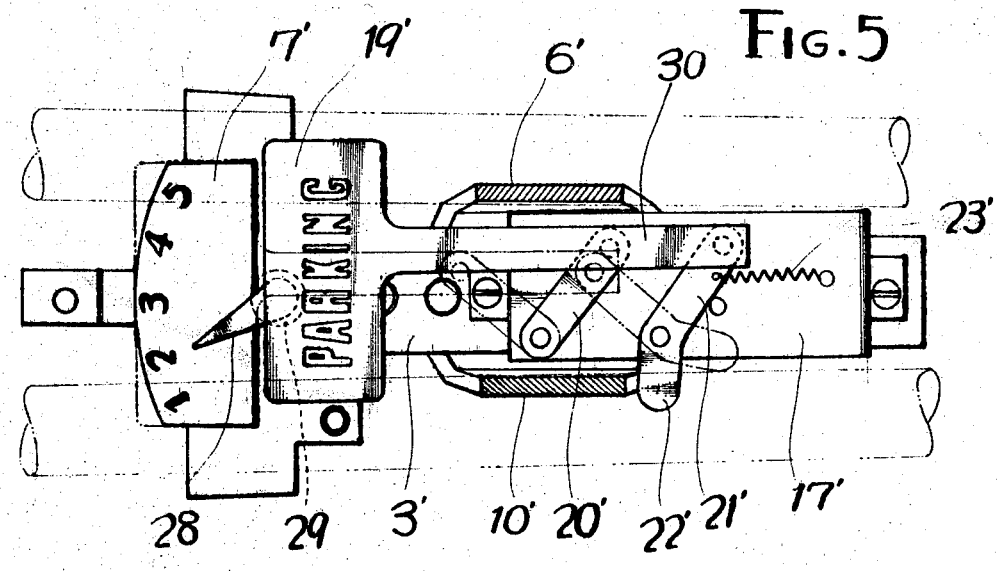

INDICATING SYSTEM OF OPERATIONAL STATE OF PARKING BRAKE FOR A BICYCLE

This invention is related to an indicating system of the operational state of a parking brake for a bicycle which has to be continuously applied to the bicycle lest it should move by itself unexpectedly against a cycler's own will when the bicycle is left parked on a sloping road or an incline. As this parking brake has conventionally been applied a caliper brake in general use of a bicycle in which a brake lever is especially devised in such a method that said caliper brake can be operated independently; said brake lever being invested with a greater resistance than the dynamical stability of a restorable spring provided on said caliper brake so that the brake lever, once manipulated, is sustained in the position where it has been just manipulated, and yet continues its breakage without being automatically restored to its original position even after it has been taken off. Thus in order to release this breakage it is necessary to additionally manipulate the brake lever to be restored to its original position.

The parking brake is applicable not only when a cycler wants to park his bicycle securely on a slope or an incline as has been mentioned, but also when he wants to cycle down in safety along a long sloping road; in this case the cycler can manage to go down an incline by applying half pressure to the brake and continuously controlling the speed of his bicycle.

As has been mentioned, the parking lever is on the one hand able to be manipulated continuously but on the other hand it has a disadvantage in that an additional operation must be made in order to release the brakeage. Therefore, if the cycler carelessly tries to pedal his bicycle after he has put on the brake, he will be unable to ride an inch and may on the worst occasion violently tumble over; on the top of that, surplus power is undesirably effected upon the brake to wear out the shoes thereof and consequently, when really necessary, the brake will not work satisfactorily.

The present invention has been made for the purpose of eliminating the aforementioned deficiencies, having for one of its main objectives the provision of such an indicating system as to warningly indicate the operational state of the parking brake when it is applied, and as a result a cycler will not go and move his bicycle inadvertently despite the fact that he has put on the brake, nor will he leave the brake as it has been put on when he intends to ride down along an incline. Another objective of this invention is to supply an indicating system that can exactly indicate each operational state of the parking brake constructed in more simplifier manner than a conventional type by the best use of the brake lever movement. Further objective of the invention lies in the provision of an indicating system with the indication of which it is possible to cloak or cover a speed-changeover indicating system. Furthermore, another objective of the invention aims at providing an indicating system that works to indicate precisely the slightest change of the brake lever movement as soon as the parking brake begins operating, and will still keep on indicating each change thereof even after the braked state has been changed as long as it is not released.

The present invention is featured where two links are pivoted on a fixing stand or plate on which the lever of the parking brake is supported to hold an indicating means, and an abutting piece is protruded to about against said lever from one of these two links so that the indicating means is transferred through this abutting piece and indicates each operational state of the parking brake.

While the specification of this invention is as made in detail in the succeeding description in accordance with the accompanied drawings, its novelty and features are as pointed out in what is claimed.

Referring to the drawings which illustrate one of the embodiments of the invention, FIG. 1 is a side view showing a part of the parking brake;

Figure 1:
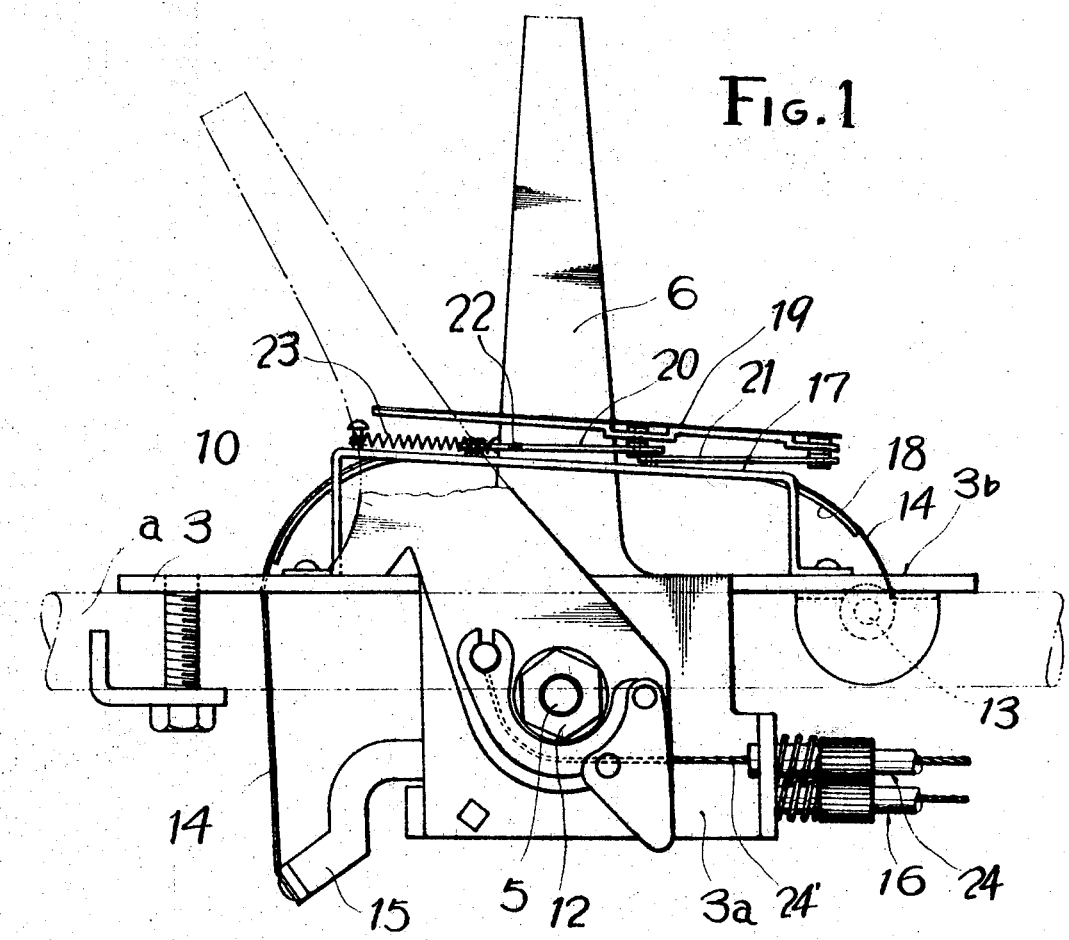
Figure 2:
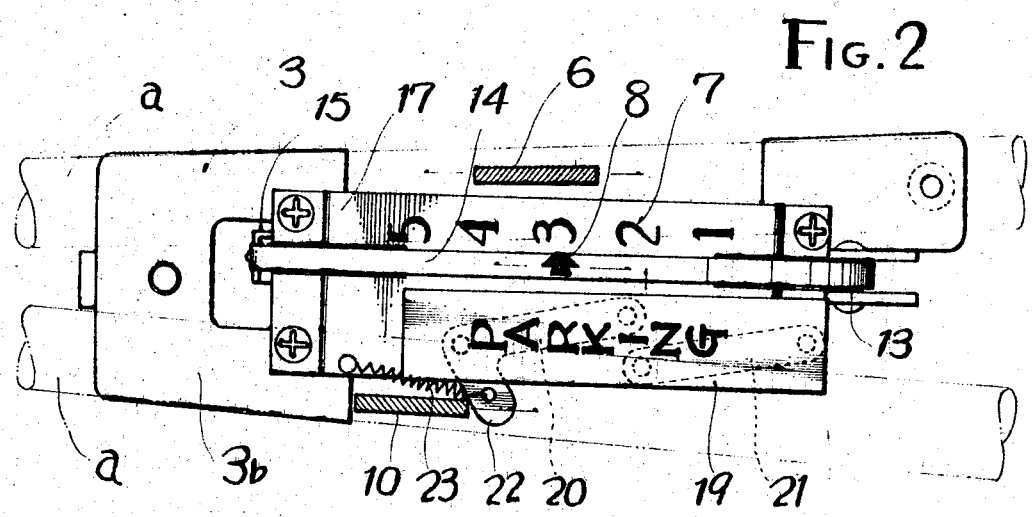
FIG. 2 is a plan view showing thereof.
Figure 3:
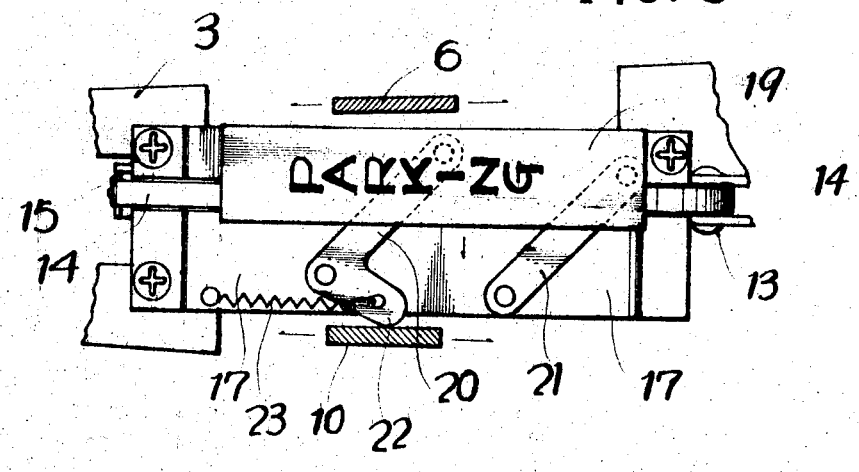
FIG. 3 is a plan view partially showing the operational state of the parking brake.
Figure 4A:
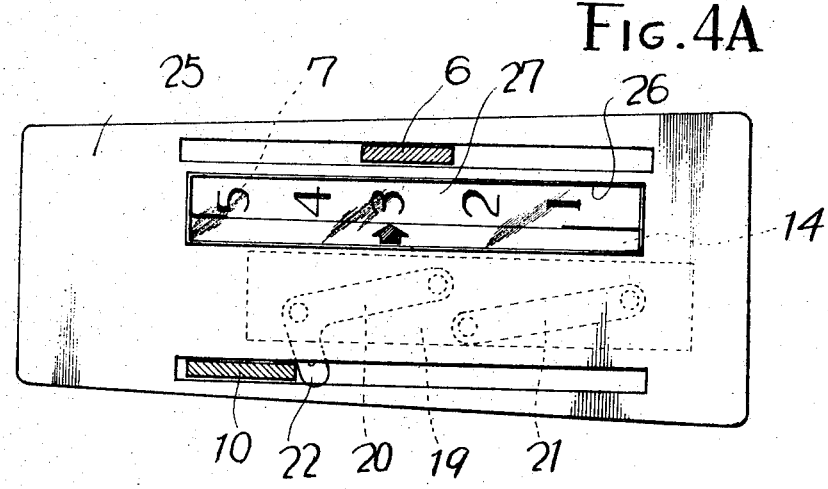
Figure 4B:
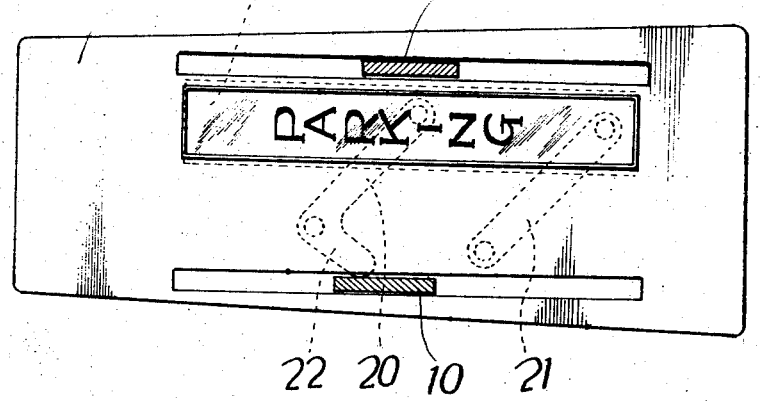

FIG. 4A, corresponds to FIG. 2 and indicates a nonparking state;

FIG. 4B corresponds to FIG. 2 and indicates a parked state; and

FIG. 5 is a plan view partially showing another embodiment of the invention.

Accounting for one of the embodiments of the present invention with reference to the FIGS. 1 through 4B, there are illustrated the lever 6 of the shift gear and the lever 10 of the parking brake provided in combination. These levers 6 and 10 are movably supported on a vertical surface 3a of the fixing plate 3 which is, for instance, fixed on the top tube a of the bicycle. Reference numeral 5 designates a lateral shaft fixedly mounted in said vertical surface 3a; the shift-gear lever 6 is movably inserted into said lateral shaft 5 and the parking brake lever 10 is also inserted therein through a washer and a dish spring. Then the outermost end of the lateral shaft 5 is tightly threaded with a nut 12 so that the parking brake lever 10 is able to rotate and also be held at a stop in a free position of its rotation. On the horizontal surface 3b of the fixing plate 3 is mounted a plate 17 supporting an indicating means which will be referred to later.

On this supporting plate 17 are indicated the signs 7 expressed for example in numerals in proportion to each degree of the shiftgear operation. A guide 18 provided on the supporting plate 17 is curved downward of the two sides thereof. A resilient steel belt 14 has one side of its suitable surface portion marked with red or any other colour, or with an arrow as is shown in the FIGS. 2 and 4 so that it can move along said sign plate 7 indicating the speed-changing state.

For a fuller understanding, one end of this steel belt 14 is rolled on a roll shaft 13 pivoted downward of the horizontal surface 3b of the fixing stand 3 and the other end thereof is fixed on the arm 15 protruded from the portion adjacent to the base of the shift-gear lever 6, and the intermediate portion of said belt 14 is positioned along said guide 18.

Thus the construction is made in such a manner that said steel belt 14 is moved along the shift-gear lever 6 simultaneously the latter is moved to switch over the shift gear and in accordance therewith the arrow 8 indicated on the steel belt 14 is to show the changed speed by indexing each numeral 7. The wire 16 linked with the shift gear has its inner wire connected to the base of the shift-gear lever 6. On the supporting stand 17 are supported the two pieces of links 20 and 21, in the free ends of which is supportedly held an indicating plate 19 marked with "PARKING" or the like. By means of the sliding movement of these two links said indicating plate 19 is selectively able to make an appearance on the side of said indication parts of the shift gear comprising the signs 7 and the steel belt 14.

From the supporting portion of the link 20, an abutting piece 22 is protruded toward the parking brake lever 10. Between said supporting piece 22 and the frontal end of the supporting stand 17 is held a spring 23 to resiliently press this abutting piece 22 against the fringe of the parking brake lever 10. The wire 24 linked with the parking brake has its inner wire 24′ connected to the base of the parking brake lever 10. Reference numeral 25 shown in the FIGS. 4a and 4b designates a shelter for covering the whole elements of the system, wherein the immediately upper portion of the signs 7 for indicating in numerals each gear-shifting state is notched to form an aperture 26. Said aperture 26 is provided with a transparent plate 27 through which said signs 7 or indication plate 19 can be seen easily.

According to the construction embodied in conformity with the present invention it is possible to switch over the shift gear through the wire 16 by moving the lever 6 just in the same manner that is conventionally applied to. Thus if the parking brake lever 10 is moved as a bicycle is wheeling on, then the indication plate 19 is also moved along therewith, and the sign 7 for indexing the changed speed is cloaked with said indication plate 19 whereby in the aperture 26 appears the indication to teach that the parking brake lever 10 has been operated and a cycler can confirm the perfect operation of the parking brake. Accordingly this makes it possible to prevent the cycler from manipulating the braking brake lever through mistake and also warn him against any mistake he happens to manipulate by so that he can directly operate the lever in the correct way. It is not only possible to apply to the parking brake and continuously control the changed speed while cycling down along a long sloping road but also possible to warn him to restore the parking brake lever 10 to its original position when he has ceased to ride down the road. Parking on a slope can be secured safely by moving the lever 10 to operate the parking brake through the wire 24, then even if he intends to ride the bicycle again, he will not go and try to move it as it is on the brake, because he can easily notice that the parking brake is working. As has been mentioned, the present invention provides such a parking brake that can be correctly manipulated by a cycler, and especially because use is made of the links 20 and 21 which move the indication plate 19 to index "PARKING" or the like, the slightest movement of the parking brake lever 10 is sufficient to make a full indication of "PARKING" or the like as is shown in the FIGS. 3 and 4a, and even if said parking brake lever 10 is moved in succession to this slightest movement, the indication plate 19 will not move along therewith, staying at its indicating position. Accordingly, even if the cycler tries to slightly move this lever 10 for the purpose of operating the parking brake before the brake works, the indication plate 19 forewarns him to manipulate the brake securely. In addition, the indication plate 19, once transferred to its indicating position, will stay in the position where it has just been transferred even after the parking brake lever 10 is transferred, namely, to the position where it should work its braking function.

According to the present invention, it is quite possible to park a bicycle on a slope in the most secured condition and especially when the cycler goes down a long a steep gradient, he can control the speed of the bicycle by means of this parking brake, in safety with the aid of the indication means giving him a visible signal to remind of the parking brake in operation. Furthermore, this indicating means can be fabricated in a very simplified structure and is all the more applicable because it merely works to indicate the signs when just transferred by means of the two links driven through the movement of the parking brake lever. As has been aforementioned, the indication is fully obtainable by dint of the slightest movement of the parking brake lever, thus this indication can be made prior to the control of the bicycle speed. Incidentally the indicating means moves within a fixed place and is also able to be maintained in any fixed position. So indication can be surely made in the position where it has been prearranged even though a cycler tries to move the brake lever inadvertently. Thus according to this invention there is no fear that the cycler might go and move the bicycle despite the fact that the parking brake has been put on. This sets free from the abrasion of the parking brake shoe and also such a jeopardy that otherwise the cycler may tumble over violently when starting to move the bicycle.

This invention is not altogether restricted only to the scope mentioned above, but it is also possible to construct it, for example as depicted in FIG. 5, by forming into an arc-shape the indicating portion 7' wherein is indicated the speed-changed state switched over by the shift-gear lever, and by moving the indicator 28 around the longitudinal shaft 29. Said indicator 28 is applicable also in case where the cylindrical shaft portion thereof is connected to the shift-gear lever 6 through the linking wire. In this case a connecting rod 30 is protruded rearwardly of the indication plate 19 and the two links 20' and 21' are in their free ends connected to said connecting rod 30.

The aforementioned embodiments of the invention are all combined constructions with the shift-gear unit, and help the indication effect be increased with the advantages that the indicated graduation of the shift gear is cloaked simultaneously the parking brake lever is manipulated, thereby preventing the cycler to operate the shift gear lever by mistake when the bicycle is in parking. However, it it to be noted that the present invention is not to be limited to the above-mentioned constructions but it is also possible to be used as a single unit of the parking brake lever. Incidentally, it is possible to use this parking brake for the exclusive purpose of a parking brake only, separate of the brake for controlling the speed of a bicycle when it is wheeling on, but it is also possible to use said parking brake as a speed-controlling brake at the same time. In the latter case, stopper is provided on the intermediate portion of the wire of the speed-controlling brake in such a manner that said stopper is placed into engagement with the notch of the insertion portion provided on the side of said parking brake lever 10. Moreover, it is also possible to use these brakes by providing a plurality of the indication plates, each marking with "PARKING," "HALF BRAKING" and etc., and also by differentiating respectively the time when each indication plate is moved so that "HALF BRAKING" is indicated when the cycler is wheeling down a gradient and "PARKING" is indicated when he puts on the brake for parking purpose.

It is believed that many advantages of an indicating system of the operational state of a parking brake for a bicycle embodying this invention will be readily understood, and although preferred embodiments are as illustrated and described, it is also to be noted that further modification and changes in the details of the construction and in combination and arrangement of parts may be resorted to which will fall within the purview of the invention as claimed.

We claim:
1. An indicator system for a bicycle having a brake system, gear shift system, and a frame, comprising:
   1. a cabinet mounted on said frame, and having a pair of slots and an opening perforated on the top thereof;
   2. pivot means affixed to said frame and inside of said cabinet;
   3. brake handle means pivotally mounted on said pivot means and extending upward therefrom through one of said slots;
   4. friction means for holding said brake handle means in position until moved manually,
   5. gear shift handle means pivotally mounted on said pivot means and extending upward therefrom through the other of said slots;
   6. speed indicating means secured to said cabinet opposite to and below said opening, said speed-indicating means having a surface with speed indication indicia thereon indicative of the gear shift condition of said gear shift system;
   7. means connected to said gear shift hand means for indicating on said speed indicator means the speed corresponding to the gear shift position;
   8. brake-indicating means movably mounted on said cabinet below said opening and parallel to said speed-indicating means, said brake-indicating means being of sufficient area to close said opening and having a surface with indicia indicative of the operational state of said brake;
   9. means connecting said brake handle means and said brake-indicating means whereby movement of said brake handle means to operate said brake moves said brake indicator means over said gear shift indicator means to simultaneously cover all of said gear shift information indicia from view through said opening; and
   10. restoring means for returning said brake indicating plate from covering position over said gear shift-indicating means when said brake handle means releases said brake and thereby enabling view of said speed indication indicia through said opening.

2. The indicator system of claim 1, wherein said opening is parallel to said slots, said restoring means comprises spring means; said connecting means comprises a pair of links pivotally mounted on said cabinet, one of said links being connected to said spring means, said one link having an extended portion contactable by said brake handle means whereby movement of said brake handle means to operate said brake moves said extended portion of said one link against pressure of said spring means to move said brake-indicating means perpendicular to direction of movement of said brake handle means, and direction of said slots, to cover said speed-indicating means to prevent view through said opening and whereby movement of said brake handle means to release said brake causes said spring means to move said brake-indicating means from above said speed-indicating means thereby to enable view thereof through said opening.

3. The indicator system of claim 1, wherein said opening is perpendicular to said slots, said speed-indicating means having indicia placed thereon readable in a direction perpendicular to said slots, said brake-indicating means having a surface displaced from and adjacent to said opening, said restoring means comprises spring means, said connecting means comprises a connecting element extending from said brake-indicating means in the same direction of said slots, a pair of lines pivotally mounted on said connecting element, one of said links being connected to said spring means, a contacting rod connectable to said one link and extending therefrom such as to be contactable by said brake handle means whereby movement of said brake handle means to operate said brake causes said brake-indicating means to move against pressure of said spring means, parallel to said slots and over said speeding indicating means to prevent view from said opening and movement of said brake handle means to release said brake causes said spring means to remove said brake-indicating means from said opening.